July 4, 1950   E. F. SMALL   2,514,345
FISHING REEL
Filed June 16, 1949   2 Sheets-Sheet 1
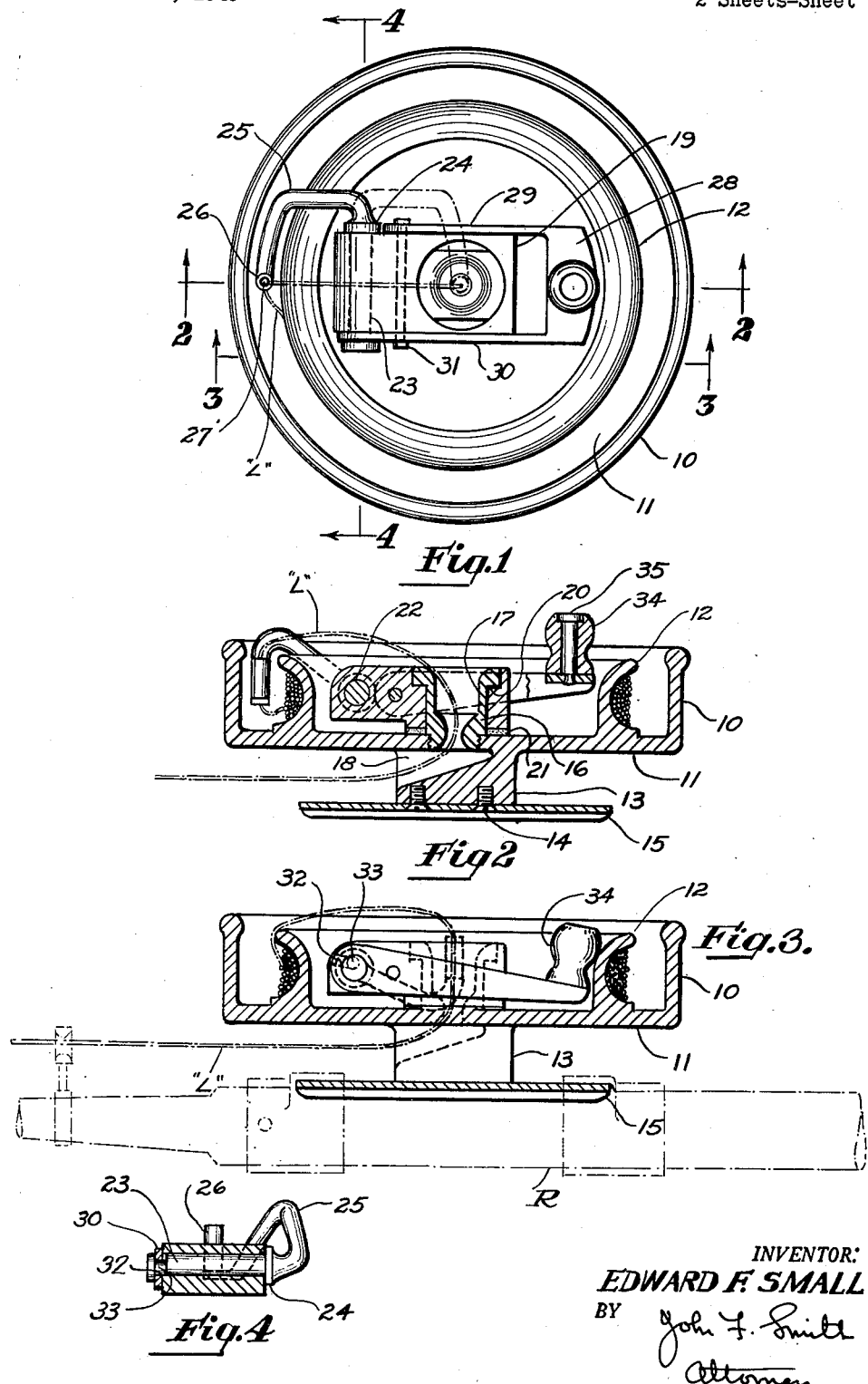
INVENTOR:
EDWARD F. SMALL
BY John F. Smith
Attorney July 4, 1950          E. F. SMALL          2,514,345

FISHING REEL

Filed June 16, 1949          2 Sheets—Sheet 2

INVENTOR:
EDWARD F. SMALL
BY John F. Smith
Attorney

Patented July 4, 1950

2,514,345

UNITED STATES PATENT OFFICE 2,514,345

FISHING REEL

Edward F. Small, Newton, Mass.

Application June 16, 1949, Serial No. 99,385

15 Claims. (Cl. 43—20)

This invention relates to fishing reels and more particularly to a type having a stationary reel and which is most useful for bait and lure casting.

The principal object of the invention is to provide a stationary reel with suitable mechanism which allows free feeding of the line while casting and yet affords rapid and accurate rewinding of the line.

Another object of the invention is to provide a fishing reel of the stationary reel type which is adapted to be secured to standard types of fishing rods.

A further object of the invention is to provide a stationary reel for securement to standard types of fishing rods, with means for guiding a line from the reel to the fishing rod which overcomes whipping and backlash of the line during and upon cessation of casting.

A still further object of the invention is to provide a stationary reel with sutable mechanism for winding a line upon the reel and which is adapted to be moved from an operative or winding position to an inoperative or casting position.

Other objects of the invention will in part be obvious and will in part appear hereinafter.

The invention accordingly comprises the features of construction, combination of elements and arrangement of parts which will be exemplified in the construction hereinafter set forth and the scope of the invention will be indicated in the claims appended hereto.

For a fuller understanding of the nature and objects of the invention reference should be had to the following detailed description taken in connection with the accompanying drawing, in which:

Fig. 1 is a side elevational view of one form of a fishing reel of my invention;

Fig. 2 is a sectional view taken substantially along lines 2—2 of Fig. 1 showing the line guide and wind handle in the operative or winding position;

Fig. 3 is a sectional view similar to Fig. 2 but taken substantially along lines 3—3 of Fig. 1 and showing the line guide and wind handle in the inoperative or casting position;

Fig. 4 is a partial sectional view taken along lines 4—4 of Fig. 1 to show details of the mechanism for moving the wind handle between its operative and inoperative positions;

Figure 5:
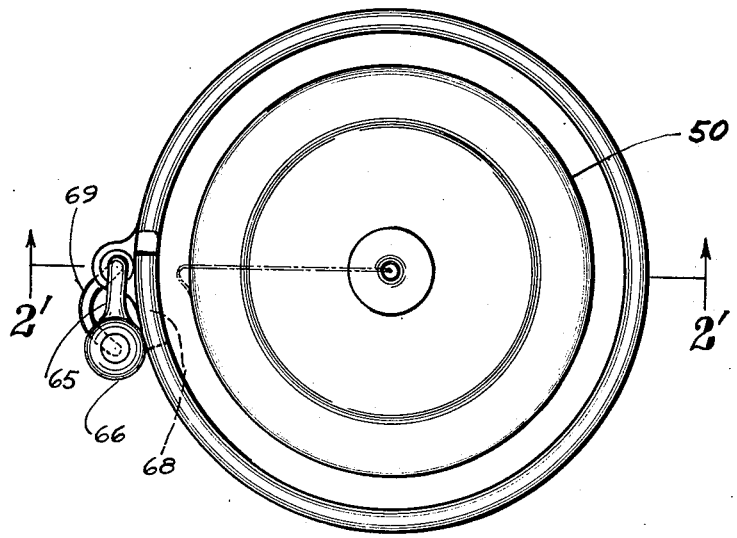
Fig. 5 is a side elevational view of another form of a fishing reel comprising my invention.

Referring to the drawings and particularly to Figs. 1, 2, 3 and 4, there is shown a fishing reel comprising a cylindrical cage 10, which may be of cast metal, moulded plastic, or the like, having an endwall 11 from the inner face of which extends a stationary reel 12 adapted to have a fishing line L wound thereupon by mechanism hereinafter described.

A pad 13 extends from the outer face of the endwall 11 and secured thereto by the screws 14 is a plate 15 which serves to seat against a fishing rod R of conventional construction and be clamped thereto in a well known manner.

The center of the endwall 11 is tapped and threaded therein is a stud 16 having a passage 17 entirely through its central portion which leads to a cavity 18 formed in the pad 13. Thus, the fishing line L may be conducted from the periphery of the reel 12 through the passage 17 and to the line guides of a rod to which the entire fishing reel of my invention may be attached.

A block 19 is journalled upon the stud 16 and the shoulder 20 formed upon the stud fits into a counterbore in the block to retain it in position.

An anti-friction washer 21 is provided between the inner face of the endwall 11 and the block 19 so that the block can be rotated freely upon the stud 16 without undue wearing of the parts.

One end of the block 19 is provided with a bore 22 to receive a shaft 23 having a shoulder 24 formed on one end thereof from which extends an arm 25. The arm is offset in a manner to allow it to reach over the rim of the reel 12 and terminates in a form of cylindrical head 26 having a passage 27 therethrough which serves as a line guide while winding a line upon the reel.

A bracket 28 has extending therefrom the arms 29 and 30 which straddle the block 19 and are pivoted thereto by the pin 31. The arm 30 extends beyond the pivot pin 31 and has a slot 32 cut thereon which is arranged to fit in a groove cut around the shaft 23 in a manner which forms an eccentric 33 as an integral part of the shaft which is best shown in Figs. 1, 3 and 4.

A wind handle 34 is held to the bracket 28 by a stud 35 so that the entire assembly of the bracket 28, block 19, and arm 29 carrying the line guide, when in the operative or wind position as shown in Figs. 1 and 2, may be rotated to wind the line L about the reel 12.

Prior to casting with the fishing reel above described, the arm 29 is grasped by the angler's fingers and is rotated from the position shown in Fig. 2 to the position shown in Fig. 3 which positions the line guide, on the end of the arm, within the passage 17 formed in the stud 16. Also, as the arm is so rotated to place its line guide in the inoperative or casting position, the shaft 23 rotates and the eccentric 33 formed thereon acts against the sides of the slot 32 and tilts the arm 30 about its pivot pin 31 so as to lower the bracket 28 and consequently the wind handle 34 to an inoperative position where it is out of the way of the line L as it unwinds from the reel 12. Thus, when the cast is made the line L is free to unwind and feed through the center of the reel 12 to the line guides of a conventional fishing rod to which the reel is attached.

Figure 6:
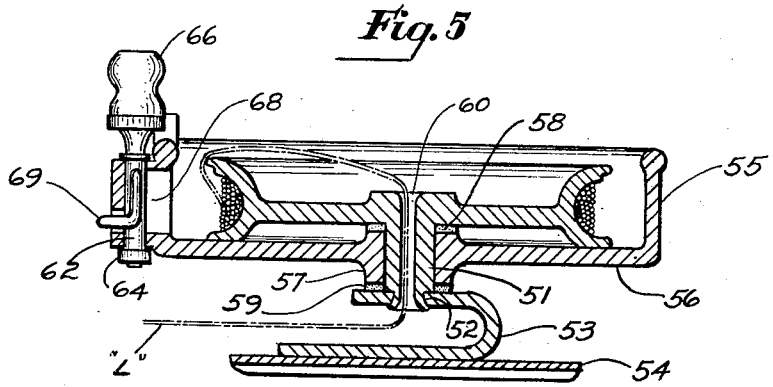
Fig. 6 is a sectional view taken substantially along lines 2'—2' of Fig. 5 and showing the wind handle and line guide in the inoperative or casting position; and, Fig. 7 is a cross sectional view similar to Fig. 6 but showing the wind handle and line guide in the operative or wind position.
Figure 7:
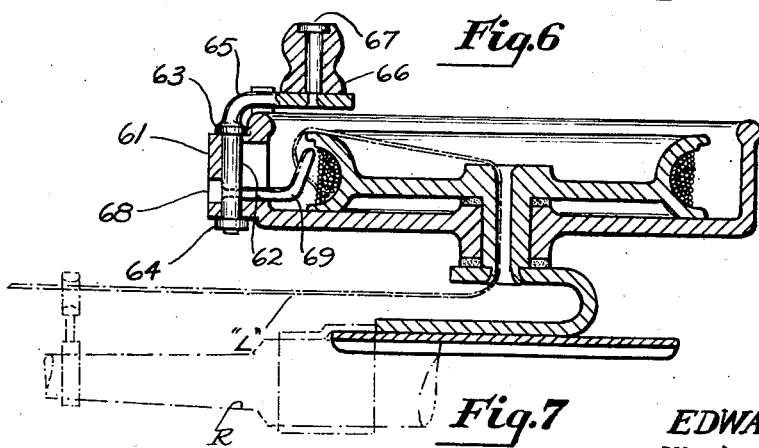

In Figs. 5, 6, and 7, there is shown another form of reel which allows a line to be fed directly from the periphery of a stationary reel through a passage formed in the center of the reel and which comprises part of my invention. This reel comprises a reel 50, preferably of metal, from which extends a hub 51 terminating in a portion 52 of reduced diameter that is riveted to a U shaped bracket 53 to which is secured, by spot welding or the like, a reel seat plate 54. Thus, the reel can be secured to a standard form of fishing rod with the axis of the reel at a right angle to the axis of the fishing rod in the same manner as conventional reels.

A cylindrical cage 55 having an endwall 56 which carries a central hub 57 is rotatably mounted upon the hub 51 extending from the reel 50 and the anti-friction washers 58 and 59, which may carry a lubricant, ensure that the cage will rotate freely.

A passage 60 is formed in the center of the reel hub and serves as a line guide to conduct the line L from the periphery of the reel to the line guides of the fishing rod to which the reel may be attached.

A boss 61 is formed on the periphery of the cage 55 and is bored to receive a shaft 62 having a shoulder 63 at one end and a collar 64 secured to the other end to retain it in position. An arm 65 extends from the shoulder 63 and is bent at a right angle to the shaft so that the wind handle 66 secured to the arm by the stud 67 can act as a crank to rotate the shaft 62 and also the entire cage 55.

An opening 68 is formed in the peripheral wall of the cage 55 and partially into the boss 61 so as to expose a portion of the shaft 62 and a line guide finger 69 is pressed to a hole formed in the exposed portion.

The line guide finger 69 is bent in the form of a hook to engage with the line L and since it is rotatable with the shaft 62 it can be swung from an operative or wind position as shown in Fig. 7 to an inoperative or casting position as shown in Figs. 5 and 6.

In casting with this reel the handle 66 is moved until it assumes the position shown in Fig. 5. Such movement of the handle rotates the shaft 62 and lifts the line guide finger 69, unhooks it from engagement with the line, and swings it through the opening in the peripheral wall of the cage 55 until the finger stops against the wall of the boss 61. The cast is now made and the line is free to unwind from the reel 50 and is conducted through the passage in the center of the reel to the line guides of the fishing rod.

To rewind, the handle 66 is moved towards the center of the reel until the line guide finger 69 stops against the wall of the opening through the cage and the handle is used to crank the cage around. During the first revolution of the cage the line guide finger hooks the line at the point where it is leading from the periphery of the reel to the central line guide formed in the reel hub and continued cranking of the handle winds the line around the reel.

It can readily be seen that the fishing reels herein described allow a line to be cast with a minimum of drag and that since the reel is stationary and the line is fed directly from periphery of the reel to a central line guide there is no whipping of the line as it leaves the line guide and therefore no appreciable backlash.

Since certain changes may be made in the above constructions and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent, is:

1. A fishing reel comprising a stationary reel adapted to be secured to a fishing rod, said reel having a passage entirely through its central portion forming a line guide through which a line is fed from said reel to the line guides of the fishing rod.

2. A fishing reel comprising a stationary reel adapted to be secured to a fishing rod, said reel having a passage entirely through its central portion forming a line guide through which a line is fed from said reel to the line guides of the fishing rod, and means for winding a line upon said reel.

3. A fishing reel comprising a stationary reel adapted to be secured to a fishing rod, said reel having a passage entirely through its central portion forming a line guide, a rotatable line guide adjacent to the periphery of said reel, and means for rotating said rotatable line guide to draw a line through said passage in the central portion of said reel and to wind it around said reel.

4. A fishing reel comprising a stationary reel adapted to be secured to a fishing rod, said reel having a passage entirely through its central portion forming a line guide, a rotatable line guide mounted for movement from a position adjacent said passage in the central portion of said reel to a position adjacent the periphery of said reel, and means for rotating said rotatable line guide.

5. A fishing reel comprising a stationary reel adapted to be secured to a fishing rod, said reel having a passage through its central portion forming a line guide, a rotatable line guide mounted for movement from a position adjacent said passage in the central portion of said reel to a position adjacent the periphery of said reel, a wind handle movable from an operative position to an inoperative position, means including said wind handle for rotating said rotatable line guide, and means whereby movement of said rotatable line guide from one of its said positions moves said wind handle to one of its said positions.

6. In a fishing reel, the combination comprising a stationary reel adapted to be secured to a fishing rod, said reel being dish shaped and having a line receiving groove around the periphery thereof, a hub extending from the central portion of said reel, said hub having a passage therethrough forming a line guide, a member lying within the dish portion of said reel and mounted for rotation upon said hub, an arm having a line guide in one end thereof, means securing said arm to said member and allowing the line guide end to be moved from a line casting position adjacent said passage through said hub to a line wind position adjacent the line receiving groove of said reel, a wind handle for rotating said member, said wind handle being movable from an inoperative position lying within the dish portion of said reel to an operative position extending out of the dish portion of said reel, and means whereby movement of said arm from a casting position to a winding position moves said wind handle from its inoperative position to its operative position.

7. A fishing reel comprising a stationary reel, said reel having a passage entirely through its central portion forming a line guide through which a line is fed from the periphery of the reel to the line guides of a fishing rod, and means attached to said reel for mounting it on a fishing rod with the axis of the reel substantially at a right angle to the axis of the rod.

8. A fishing reel comprising a stationary reel, said reel having a passage entirely through its central portion forming a line guide through which a line is fed from the periphery of the reel to the line guides of a fishing rod, means attached to said reel for mounting it on a fishing rod with the axis of the reel substantially at a right angle to the axis of the rod, and means for winding a line upon said reel.

9. A fishing reel comprising a stationary reel, said reel having a passage entirely through its central portion forming a line guide through which a line is fed from the periphery of the reel to the line guides of a fishing rod, means attached to said reel for mounting it on a fishing rod with the axis of the reel substantially at a right angle to the axis of the rod, and rotatable means for engaging a line wound upon said reel at a point adjacent to the periphery of the reel for winding the line around the reel.

10. A fishing reel comprising a stationary reel, said reel having a passage entirely through its central portion forming a line guide through which a line is fed from the periphery of the reel to the line guides of a fishing rod, means attached to said reel for mounting it on a fishing rod with the axis of the reel substantially at a right angle to the axis of the rod, a rotatable line engaging member for winding a line about said reel, and means allowing said line engaging member to be moved into and out of engagement with the line.

11. A fishing reel comprising a stationary reel, said reel having a passage entirely through its central portion forming a line guide through which a line is fed from the periphery of said reel to the line guides of a fishing rod, means for mounting said reel on a fishing rod, a member mounted adjacent to the periphery of said reel for engaging a line leading therefrom to said passage, and means for moving said member around the periphery of said reel to wind the line thereabout.

12. A fishing reel comprising a stationary reel, said reel having a passage entirely through its central portion forming a line guide through which a line is fed from the periphery of said reel to the line guides of a fishing rod, means for mounting said reel on a fishing rod, a member mounted adjacent to the periphery of said reel for engaging a line leading therefrom to said passage, means for moving said member around the periphery of said reel to wind the line thereabout, and means for moving said member from an operative position to an inoperative position.

13. A fishing reel comprising a stationary reel, said reel having a passage entirely through its central portion forming a line guide through which a line is fed from the periphery of said reel to the line guides of a fishing rod, means for mounting said reel on a fishing rod, a member mounted adjacent to the periphery of said reel for engaging a line leading therefrom to said passage, and a single means for moving said member around the periphery of said reel to wind the line thereabout and for moving said member from an operative position to an inoperative position.

14. In combination with a fishing rod, a stationary reel, said reel having a passage through its central portion forming a line guide through which a line is fed from the periphery of said reel to the line guides of the rod, a line engaging member, means mounting said line engaging member adjacent the periphery of said reel, and means for moving said member around the periphery of said reel to wind a line thereabout.

15. In combination with a fishing rod, a stationary reel, said reel having a passage through its central portion forming a line guide through which a line is fed from the periphery of said reel to the line guides of the rod, a line engaging member, means mounting said line engaging member adjacent the periphery of said reel, means for moving said member around the periphery of said reel to wind a line thereabout, and means for moving said member to an operative position to engage the line for winding and to an inoperative position to disengage said line for casting.

EDWARD F. SMALL.

No references cited.